Nov. 20, 1951  M. J. ALGER, JR  2,575,545
CIRCUIT FAILURE PROTECTION DEVICE
Filed June 22, 1950
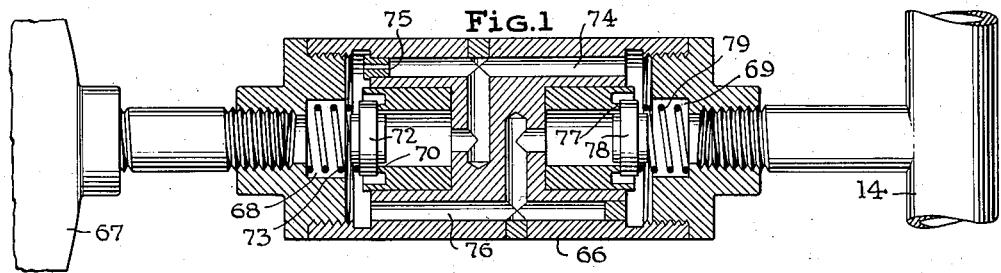
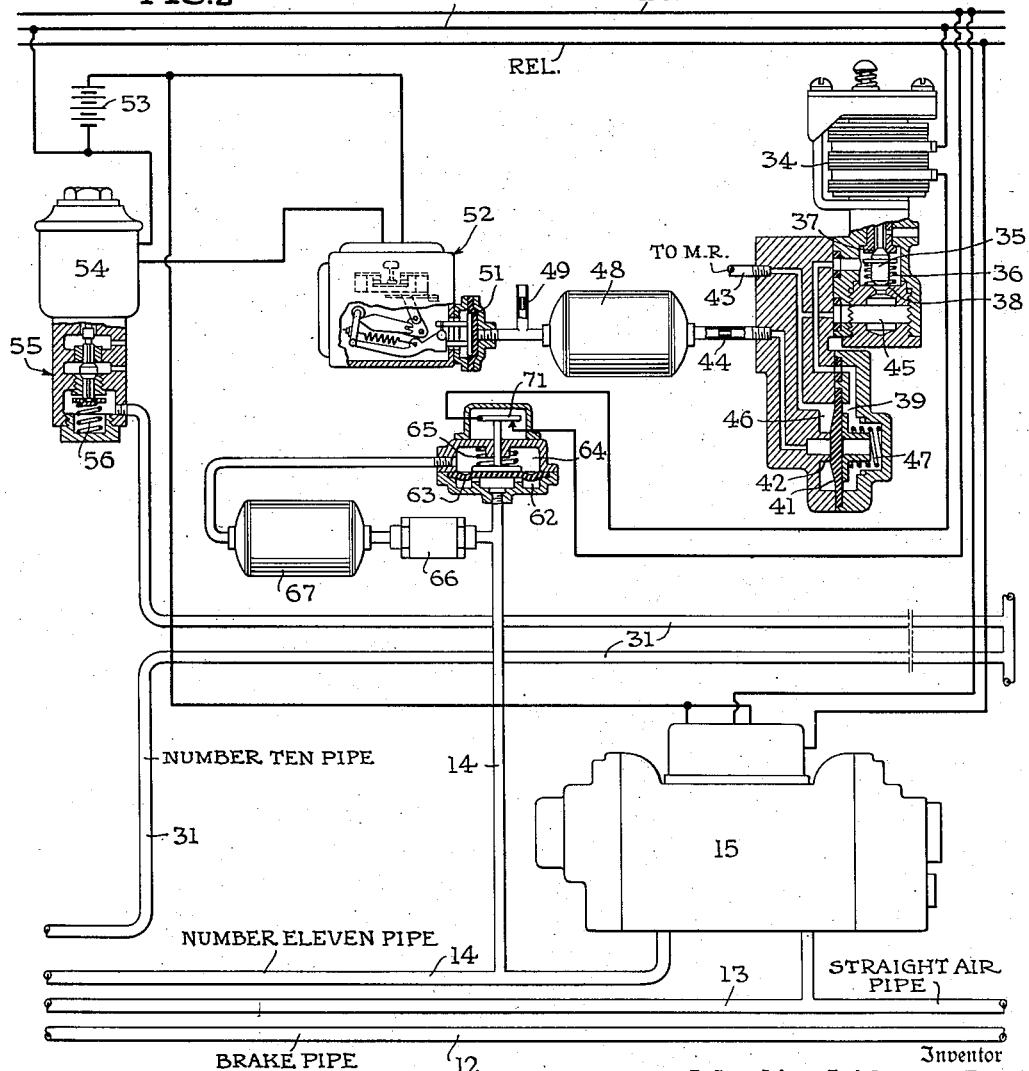
Inventor
Martin J. Alger, Jr.
By Dodge and Sons
Attorneys Patented Nov. 20, 1951

2,575,545

UNITED STATES PATENT OFFICE 2,575,545

CIRCUIT FAILURE PROTECTION DEVICE

Martin J. Alger, Jr., Watertown, N. Y., assignor to The New York Air Brake Company, a corporation of New Jersey Application June 22, 1950, Serial No. 169,673

2 Claims. (Cl. 303—26)

This invention relates to air brakes, and particularly to those electro-pneumatic brake systems in which an automatic brake system and an electro-pneumatic straight-air brake system are inter-related, and the engineer's brake valve can be set selectively to control on either basis.

The train is normally controlled by manual actuation of the electro-pneumatic straight-air system. The electrical part of such a system must operate on the open-circuit basis, so that electrical failures are not on the side of safety, but continuous availability of automatic emergency and ready availability of the entire automatic system afford a safety factor instantly usable by the engineer so long as his responses are conventional.

Surprise leads to unconventional response in some cases, and as a second safety measure John V. V. Elsworth devised a system which causes a brake application in response to derangement of the electro-pneumatic system sufficient to cause the master controller to cycle. That concept is described and claimed in his allowed application Serial No. 100,928, now Patent No. 2,527,920 issued October 31, 1950.

The present invention affords means to prevent simulation of cycling action by improper manipulation of the engineer's brake valve. It was found that by making a series of very light and carefully timed brake applications on a test installation of the Elsworth device, that device could be made to function when in perfect order as it should function in response to a deranged circuit. While such manipulation is outside the useful range, it is important from a railroad operating standpoint to preclude even the possibility of trick manipulation.

The present invention accomplishes the desired result by changing the charging control of a pneumatic timing device already present in the Elsworth mechanism.

The invention will now be described by reference to the accompanying drawing in which:

Fig. 1 is a longitudinal section of the preferred form of the improved charging control drawn on a larger scale than that of Fig. 2.

Fig. 2 is a reproduction of Fig. 4 of the Elsworth application with the improved charging control inserted in the system.

General considerations

The engineer's brake valve in the 24–RL brake system includes a so-called service application valve, and the engineer's brake valve is manually convertible for operation selectively on the straight-air principle and on the automatic principle. When set for operation on the automatic principle, the engineer's brake valve applies and releases the brakes by controlling the pressure in the normally charged brake pipe 12. When set to operate on the electro-pneumatic straight-air principle, the engineer's brake valve controls the pressure in a pipe 14 which, in the parlance of the art, is known as the "number eleven pipe." The pressure established in the "number eleven pipe" pilots the operation of the master controller 15 which in turn operates admission and relief magnet valves throughout the train to establish a related pressure in the straight-air pipe 13 and so apply and release the brakes.

It will be apparent from what has just been said, that if the engineer manipulates the engineer's brake valve to produce a straight-air application, and there is then a break in the straight-air pipe, or a serious leak therefrom, or if one or more release magnet valves fail to function or one or more application magnet valves fail to function, the result will be disturbance of the functioning of the master controller 15.

Most malfunctions short of complete circuit failure (against which the system offers other safeguards), cause the master controller 15 to cycle, a phrase used to designate reciprocation of its switch members; i. e., recurrent operation of the controller. The essence of the Elsworth invention is the use of this recurrent operation or cycling to cause actuation of the service application valve which is already present in the system. Actuation of the application valve causes a full-service application of the brakes on the automatic principle.

The Elsworth device has the great advantage that significant derangements of the straight-air system, but not trivial derangements thereof, cause an automatic full service application of the brakes.

Operation of the application valve is effectuated by venting a pipe known in the art as the "number ten pipe." This pipe is designated by the reference numeral 31 on the drawing. The term "automatic full-service application" is used to mean a brake application of full-service intensity produced on the automatic side of the brake system.

According to the Elsworth invention, as shown in the accompanying drawing, a winding 34 is connected between the line B and the application line so that whenever the master controller 15 functions, the winding 34 is energized. The armature for the winding 34 operates a double beat poppet valve 35, which is biased by a coil compression spring 36 toward an exhaust seat 37 and away from an inlet seat 38. The valve 35 controls the pressure in the chamber 39 behind a combined flexible diaphragm and valve 41.

The combined valve and diaphragm 41 seats against an annular seat 42 and controls flow from a main reservoir connection 43 to a choke 44. Main reservoir pressure from the connection 43 is always present in the space 45 beneath the inlet seat 38 and is also present in the annular space 46 to the left of the diaphragm 41. The combined valve and diaphragm 41 is biased toward its seat by a coil compression spring 47.

Thus, whenever winding 34 is not energized, diaphragm valve 41 is closed but each time that winding 34 is energized the valve 41 opens, and stays open as long as the winding 34 is energized. It then supplies air through the choke 44 to a small reservoir or accumulator volume 48 which is continuously vented to atmosphere through another choke 49. The sizes of the chokes 44 and 49 are so coordinated that the choke 49 will substantially dissipate pressure in the volume 48 except when winding 34 is energized with a frequency so high as to indicate derangement of the system. When pressure builds up in the volume 48, it reacts on the motor diaphragm 51 of the normally closed pressure switch, generally indicated by the numeral 52.

The source of current for the lines APP, B and REL is typified by the battery 53. The switch 52 is arranged to control a circuit from this battery through the winding 54 of a magnet-valve generally indicated at 55. The valve 55 is biased to open by a coil compression spring 56 and when opened vents the pipe 31. It follows that the winding 54 normally is constantly energized and holds the valve 55 closed. Maintained closure is dependent on integrity of the circuit. The switch 52 is normally closed but will be opened if the volume 48 is sufficiently charged. Thus, excessive cycling of the master controller 15 causes charging of the volume 48; charging of this volume opens the switch 52, and this allows the valve 55 to open and vent the pipe 31.

Venting of the pipe 31 produces an automatic service application which is beyond the control of the engineer, and which warns him that the electro-pneumatic system is seriously deranged. If he cannot discover and quickly correct the defect, all he need do is convert his engineer's brake valve to automatic operation, and proceed on the automatic principle.

The Elsworth invention includes means which are effective to prevent an initial heavy service application from charging the volume 48. The protective means comprises a timed switch mechanism which in the embodiment of Fig. 4, prevents energization of winding 34 for a definite time interval if the number eleven pipe 14 is put under pressure. The present invention modifies this device in such a way as to give it two useful functions instead of one.

A branch of the number eleven pipe leads to the lower chamber 62 of a diaphragm switch mechanism in which a flexible diaphragm 63 is interposed between the chamber 62 and an upper chamber 64. A biasing spring 65 urges the diaphragm to its lower position in which a normally closed switch 71 establishes the circuit from the application wire through the winding 34 to the B wire. A choke connection 66 leads from the number eleven pipe 14 to a small volume chamber 67 which in turn is in free communication with the upper chamber 64 of the diaphragm switch.

In the Elsworth device the choke connection 66 is a simple fixed capacity choke. The present invention substitutes for this simple single capacity choke a dual choke which affords an extremely low charging rate when the pressure rise in the number eleven pipe 14 is low and a materially larger flow rate when the pressure rise is large.

This choke arrangement whose housing is indicated by the numeral 66 contains the essential novel features of the present invention and it is illustrated in detail in Fig. 1. The housing 66 is hollow and affords a flow path between the branch of pipe 14 and the volume reservoir 67.

The housing 66 has in its left end a chamber 68 in free communication with volume 67 and at its right end a chamber 69 in free communication with pipe 14. At the left end there is a valve seat 70 for check valve 72 which is seated and moderately loaded by a coil compression spring 73 and controls flow from chamber 69 to chamber 68. Valve 72 opens when pressure in chamber 69 is more than a predetermined amount higher than that in chamber 68. A desirable differential at which valve 72 opens is 5 p. s. i. A passage 74 leads from chamber 69 to valve 72 and also to a by-pass choke 75, so that at pressure differentials below the predetermined value choke 75 controls the rate of charging flow.

Reverse flow from chamber 68 to chamber 69 is through passage 76 and valve seat 77. Check valve 78 is barely held to its seat by the light spring 79 so that it offers no significant resistance to flow from volume 67 to pipe 14 but closes at the slightest tendency for flow to occur in the opposite direction.

If the engineer makes a sharp sustained increase in the pressure in pipe 14, as he does to produce a heavy initial brake application, the flow to chamber 67 will be determined by the flow capacity of the seat 70 and passage 74 for the pressure differential developed will be such as to unseat valve 72. This pressure acting under the diaphragm 63 will open the switch 71 and hold it open until reservoir 67 charges to a pressure equal to that in the pipe 14. Then the switch 71 will close, winding 34 will be energized and charging of the volume 48 will commence. Thus, charging of the volume 48 is delayed for a period approximating the maximum period used in an initial heavy straight-air application.

On release the exhaust check valve 78 opens quite freely and permits pressure in the volume 67 to be dissipated quickly. Now suppose that the engineer attempts a trick manipulation in which he makes a series of very light and carefully timed application movements of the engineer's brake valve. The effect will be to produce pressure rises in the number eleven pipe 14 that cause the master controller to reciprocate much as it does when cycling. However, the pressure pulses in the number eleven pipe 14 will open switch 71 synchronously with the reciprocation of the master controller. Consequently reservoir 48 will not be charged.

It is possible to choose a choke 75 of such size and a spring 73 of such strength that it is impossible to develop any significant pressure in the volume 48 by producing a series of small pressure rises in the pipe 14, or by making a heavy initial straight-air application.

The release check valve 78 is not spring loaded and hence opens freely to permit discharge flow from the reservoir 67. In the Elsworth device as originally contrived, no release check valve was necessary because the single choke was adequate for exhaust flow there required. In the present device the choke 75 is quite small and would unduly delay exhaust flow from the volume 67. The valve 78 takes no part in the timing function but it does make it possible to use a smaller choke 75 than could otherwise be used.

The functions characteristic of the Elsworth device are retained but another useful function is added.

In the claims the term "control pipe" will be used as a generic term when referring to pipe 14. The term "number eleven pipe" is thought to have possible limiting connotation and is avoided for this reason.

I claim:

1. The combination of an electro-pneumatic brake system comprising a normally vented straight-air pipe, a normally charged automatic brake pipe; normally inactive application valve means for dissipating the charge in the brake pipe; a pneumatically actuated master controller arranged to control pressure in the straight-air pipe and having pneumatically actuated follow-up means responsive to resulting pressure changes in the straight-air pipe; a control pipe for communicating controlling pressures to said master controller; a reservoir having a restricted inlet and a constantly open restricted vent; electrically controlled valve means energized by said master controller in each functional response thereof and when energized serving to deliver an increment of air under pressure to said inlet; safety means responsive to pressure in said reservoir and serving upon the development of a predetermined pressure therein to cause actuation of said application valve means; and timed switch means for suspending the operation of said electrically controlled valve means synchronously with minor pulses of control pipe pressure, said timed switch means comprising a timing volume, a switch, means biasing the switch closed, a double-acting motor having a movable abutment connected to actuate the switch and subject in a switch opening direction to control pipe pressure and in a switch closing direction to pressure in said timing volume, and means affording at least two parallel connections between said timing volume and the control pipe, namely, a restricted charging connection and a large capacity check valve permitting free flow from the timing volume to the control pipe.

2. The combination of an electro-pneumatic brake system comprising a normally vented straight-air pipe, a normally charged automatic brake pipe; normally inactive application valve means for dissipating the charge in the brake pipe; a pneumatically actuated master controller arranged to control pressure in the straight-air pipe and having pneumatically actuated follow-up means responsive to resulting pressure changes in the straight-air pipe; a control pipe for communicating controlling pressures to said master controller; a reservoir having a restricted inlet and a constantly open restricted vent; electrically controlled valve means energized by said master controller in each functional response thereof and when energized serving to deliver an increment of air under pressure to said inlet; safety means responsive to pressure in said reservoir and serving upon the development of a predetermined pressure therein to cause actuation of said application valve means; and timed switch means for suspending the operation of said electrically controlled valve means for a definite time during a sustained rise of control pipe pressure and also synchronously with minor pulses of control pipe pressure but not at other times, said timed switch means comprising a timing volume, a switch, means biasing the switch closed, a double-acting motor having a movable abutment connected to actuate the switch and subject in a switch-opening direction to control pipe pressure and in a switch-closing direction to pressure in said timing volume, and means affording three parallel connections between said volume and the control pipe, namely, a restricted charging connection, a large capacity check valve permitting free flow from the timing volume to the control pipe and a loaded valve arranged to open and materially increase the charging rate when control pipe pressure predominates by a predetermined amount.

MARTIN J. ALGER, Jr.

No references cited.